(12) United States Patent
Lindle et al.

(10) Patent No.: US 10,224,036 B2
(45) Date of Patent: Mar. 5, 2019

(54) AUTOMATED IDENTIFICATION OF VERBAL RECORDS USING BOOSTED CLASSIFIERS TO IMPROVE A TEXTUAL TRANSCRIPT

(71) Applicant: InfraWare, Inc., Terre Haute, IN (US)

(72) Inventors: Nathan Lindle, Terre Haute, IN (US); Nick Mahurin, Terre Haute, IN (US)

(73) Assignee: InfraWare, Inc., Terre Haute, IN (US)

( * ) Notice: Subject to any disclaimer, the term of this patent is extended or adjusted under 35 U.S.C. 154(b) by 0 days.

(21) Appl. No.: 15/624,370

(22) Filed: Jun. 15, 2017

(65) Prior Publication Data

US 2017/0294190 A1 Oct. 12, 2017

Related U.S. Application Data

(63) Continuation-in-part of application No. 15/164,655, filed on May 25, 2016, now Pat. No. 9,711,147.
(Continued)

(51) Int. Cl.
*G10L 15/06* (2013.01)
*G10L 15/183* (2013.01)
(Continued)

(52) U.S. Cl.
CPC .............. *G10L 15/26* (2013.01); *G01L 15/00* (2013.01); *G06F 17/2258* (2013.01);
(Continued)

(58) Field of Classification Search
CPC ......... G10L 15/01; G10L 15/06; G10L 15/32; G10L 15/183; G10L 15/26; G06K 9/6227; G06K 9/6256
(Continued)

(56) References Cited

U.S. PATENT DOCUMENTS

| 6,167,117 A | * | 12/2000 | Will | H04M 1/271 704/255 |
| 6,366,882 B1 | * | 4/2002 | Bijl | G10L 15/26 704/231 |

(Continued)

OTHER PUBLICATIONS

Moreno et al., "A Boosting Approach for Confidence Scoring", Proceedings of EuroSpeech, Dec. 2001, 5 Pages.*
(Continued)

*Primary Examiner* — Martin Lerner
(74) *Attorney, Agent, or Firm* — Ice Miller LLP

(57) ABSTRACT

In at least one exemplary embodiment for automated document identification and language dictation recognition systems, the system comprises a database capable of receiving a plurality of verbal records, the verbal record comprising at least one identifier and at least one verbal feature and a processor operably coupled to the database, where the processor has and executes a software program. The processor being operational to identify a subset of the plurality of verbal records from the database, extract at least one verbal feature from the identified records, analyze the at least one verbal feature of the subset of the plurality of verbal records, process the subset of the plurality of records using the analyzed feature according to at least one reasoning approach, generate a processed verbal record using the processed subset of the plurality of records, and deliver the processed verbal record to a recipient. The processor being further operational to extract features for a pool of training documents, to turn each transcription job into a feature vector which can be used by a traditional classifier, creating classifiers with different parameters in order to explore the best possible strategy, evaluating performance of all classifiers, creating a boosting classifier, calculating performance statistics, and operating the automatic document identifier for all documents.

16 Claims, 11 Drawing Sheets

Related U.S. Application Data which is a continuation of application No. 13/877,994, filed as application No. PCT/US2011/054857 on Oct. 5, 2011, now Pat. No. 9,377,373.

(60) Provisional application No. 61/389,836, filed on Oct. 5, 2010.

(51) Int. Cl.

| | |
|---|---|
| *G10L 15/26* | (2006.01) |
| *G06F 17/22* | (2006.01) |
| *G06F 17/27* | (2006.01) |
| *G10L 15/18* | (2013.01) |
| *G10L 15/02* | (2006.01) |
| *G10L 15/30* | (2013.01) |
| *G10L 15/00* | (2013.01) |
| *G01L 15/00* | (2006.01) |
| *G06N 99/00* | (2019.01) |
| *G06K 9/62* | (2006.01) |

(52) U.S. Cl.
CPC ....... *G06F 17/2705* (2013.01); *G06K 9/6255* (2013.01); *G06K 9/6256* (2013.01); *G06K 9/6276* (2013.01); *G06N 99/005* (2013.01); *G10L 15/00* (2013.01); *G10L 15/02* (2013.01); *G10L 15/1822* (2013.01); *G10L 15/30* (2013.01); *G10L 2015/025* (2013.01)

(58) Field of Classification Search
USPC .................. 704/231, 255, 235, 243; 706/12
See application file for complete search history.

(56) References Cited

U.S. PATENT DOCUMENTS

| | | | | |
|---|---|---|---|---|
| 7,570,816 B2* | 8/2009 | Bargeron | ............. | G06K 9/6256 |
| | | | | 382/176 |
| 7,774,196 B2* | 8/2010 | Cote | .................... | G10L 15/183 |
| | | | | 704/10 |
| 8,566,088 B2* | 10/2013 | Pinson | .................... | G10L 15/02 |
| | | | | 704/235 |
| 9,224,097 B2* | 12/2015 | Rasolzadeh | .......... | G06K 9/6256 |
| 9,377,373 B2* | 6/2016 | Mahurin | ................ | G10L 15/26 |
| 9,401,140 B1* | 7/2016 | Weber | .................... | G10L 15/00 |
| 9,576,579 B1* | 2/2017 | Witt-ehsani | .......... | G10L 15/063 |
| 9,711,147 B2* | 7/2017 | Mahurin | ................ | G10L 15/26 |
| 2003/0110147 A1* | 6/2003 | Li | ........................ | G06K 9/6231 |
| | | | | 706/1 |
| 2004/0249628 A1* | 12/2004 | Chelba | .................. | G10L 15/197 |
| | | | | 704/4 |
| 2005/0182628 A1* | 8/2005 | Choi | .................... | G10L 15/183 |
| | | | | 704/252 |
| 2006/0062451 A1* | 3/2006 | Li | ........................ | G06K 9/6256 |
| | | | | 382/159 |
| 2006/0069678 A1* | 3/2006 | Chou | ................ | G06F 17/30707 |
| 2006/0222239 A1* | 10/2006 | Bargeron | ........... | G06K 9/00442 |
| | | | | 382/159 |
| 2007/0219798 A1* | 9/2007 | Wang | .................... | G10L 15/063 |
| | | | | 704/257 |
| 2007/0271093 A1* | 11/2007 | Wang | ...................... | G10L 25/78 |
| | | | | 704/210 |
| 2008/0205750 A1* | 8/2008 | Porikli | ................ | G06K 9/6257 |
| | | | | 382/159 |
| 2009/0171662 A1* | 7/2009 | Huang | ................ | G10L 15/1822 |
| | | | | 704/251 |
| 2010/0121638 A1* | 5/2010 | Pinson | .................... | G10L 15/02 |
| | | | | 704/235 |
| 2010/0173269 A1* | 7/2010 | Puri | .................... | G09B 19/0092 |
| | | | | 434/127 |
| 2014/0029840 A1* | 1/2014 | Jebara | ................. | G06K 9/6256 |
| | | | | 382/159 |

OTHER PUBLICATIONS

Wikipedia, "Boosting (machine learning)", downloaded Nov. 21, 2017, 7 Pages.*

* cited by examiner

AUTOMATED IDENTIFICATION OF VERBAL RECORDS USING BOOSTED CLASSIFIERS TO IMPROVE A TEXTUAL TRANSCRIPT

CROSS REFERENCE TO RELATED APPLICATIONS

The present application is a continuation-in-part of now U.S. Pat. No. 9,711,147, issued 18 Jul. 2017, which is a continuation of U.S. Pat. No. 9,377,373, filed on Apr. 5, 2014, which is related to and claims the priority benefit to International Patent Application Serial No. PCT/US2011/054857, filed Oct. 5, 2011 and U.S. Provisional Patent Application Ser. No. 61/389,836, filed Oct. 5, 2010. The contents of the aforementioned applications are hereby incorporated by reference in their entirety into this disclosure.

BACKGROUND

The transfer of verbal dictation to a concise written format is an integral part of business in many parts of society. For instance, due to the increasing amounts of audio medical records, the medical transcription industry is currently estimated to be a multibillion dollar industry. With the steady increase in size and complexity of healthcare and the desire to minimize costs associated with routine practices, there is a large push to automate routine practices, such as dictation and automatic speech recognition (ASR).

The final documents generated by transcription services differ greatly from the initial ASR output due to a number of inherent problems. Briefly, in addition to problems with the doctor's speech and common ASR problems (e.g., disfluencies, omission of function words, and wrong word guesses), there are conventions used in the final document which are generally not dictated (e.g., section headings, preamble, enumerated lists, medical terminology, and various pieces of additional structure). Traditional ASR has not focused on some of these issues, which are extremely important in fields such as medical transcription that have a specific format and high degree of specialization.

Additionally, there are a number of reasons that it is important to know the document type of a transcription job when. It helps to know which template should be used for transcribing the document, which workflow rules should be used, and to make sure the transcriptionist is qualified to transcribe the content. When performing speech recognition, knowing which document type the job is can help narrow the language model, assist in heading detection, and assist in punctuation insertion. For this reason, it is beneficial to know the document type prior to any speech recognition or transcription being performed on a job.

BRIEF SUMMARY

The disclosure of the present application provides various systems for analyzing and processing verbal records and methods of using and performing the same. In at least one embodiment, an exemplary system is operable to analyze medical dictation and process the analyzed form into a textual format.

In at least one embodiment of a system for analyzing verbal records to provide a desired outcome, the system comprises a database capable of receiving a plurality of verbal records, the verbal record comprising at least one identifier and at least one verbal feature, and a processor operably coupled to the database, the processing having and executing a software program. The processor is operational to identify a subset of the plurality of verbal records from the database, extract at least one verbal feature from the identified verbal records, analyze the at least one extracted verbal feature, process the subset of the plurality of records using at least one analyzed feature according to at least one reasoning approach, generate a processed verbal record using the processed subset of the plurality of records, and deliver the processed verbal record to a recipient.

Additionally, the at least one verbal feature may comprise at least one acoustic feature, such as a waveform. The processor may further be capable of converting the verbal record into a text format, such as an XML format.

The at least one verbal feature, in an exemplary embodiment, may comprise at least one first feature selected from a group consisting of a word feature and a phonetic feature. The word feature may be selected from a group consisting of a target word and a word stem, or a combination thereof. The phonetic feature may be selected from a group consisting of a number of syllables, a syllable duration pause, duration and pitch value, or a combination thereof. Moreover, the processor may be capable of using the at least one first feature to determine a position of a punctuation feature in the subset of the plurality of verbal records and introduce the punctuation feature at the position. Further, the processor may also be able to use at least one first feature to introduce at least one heading, at least one numbered list, at least one medication list, or at least one capitalization of an identified word into the subset of the plurality of verbal records.

The at least one verbal feature, in an exemplary embodiment, may further comprise at least one second feature from the subset of the plurality of verbal records, where the at least one second feature is selected from the group consisting of a part of speech tag, a chunk parse, a target word, a word stem, a number of syllables, a syllable duration pause, a duration and pitch value, or a combination thereof. The processor may also be operational to process the subset of the plurality of records using the at least one second feature according to at least one reasoning approach. Processing of the subset of records may include the addition of a processed component to the verbal record, where the processed component may be selected from a group consisting of a period, a comma, a flagged heading, a flagged numbered list, and a capitalization change. The at least one reasoning approach may in at least one embodiment be selected from the group consisting of a heuristic heading detection algorithm, a heuristic numbered list detection algorithm, a memory-based learner using Levenshtein distance metric and a memory based learner using overlap distance metric.

According to at least one embodiment of the system for analyzing verbal records, the plurality of verbal records may have been edited, at least in part, by at least one transcriptionist.

In at least one embodiment of the system for analyzing verbal records, the system may also comprise an enrollment module capable of receiving at least one verbal expression of a participant, the enrollment module being capable of processing the at least one verbal expression to generate a candidate rating for the participant. The at least one verbal expression may be selected from the group consisting of an audio characteristic and a content characteristic. Further, the processor may additionally be capable of receiving the candidate rating and adjusting at least one parameter used to process the subset of the plurality of verbal records based on the candidate rating.

In at least one embodiment of the system for analyzing verbal records, the system may further comprise an editing device in communication with the database and/or the processor, the editing device being capable of receiving at least one processed verbal record. Moreover, the editing device may additionally be capable of accepting at least one command from a user, wherein the at least one command modifies the at least one processed verbal record.

According to at least one embodiment of the system for analyzing verbal records, the system may also comprise a connection to at least one additional processor.

According to at least one embodiment of a computer-implemented method of processing dictation, the method comprises the steps of introducing a plurality of verbal records, which may optionally have been edited, at least in part, by at least one transcriptionist, to a system for analyzing verbal records to provide a desired outcome. The system in at least one embodiment of the method of processing dictation comprises a database capable of receiving a plurality of verbal records, the verbal record comprising at least one identifier and at least one verbal feature, and a processor operably coupled to the database, the processor having and executing a software program and operational to identify a subset of the plurality of verbal records from the database, extract at least one verbal feature from identified records, analyze the at least one extracted feature, process the subset of the plurality of records using the analyzed feature according to at least one reasoning approach, generate a processed verbal record using the processed subset of the plurality of records, and deliver the processed verbal record to a recipient. The method of processing dictation may also comprise the steps of modifying the identified subset of the plurality of verbal records with the system to create a modified verbal record, wherein the system uses the at least one analyzed verbal feature and at least one reasoning approach to generate the modified verbal record, and delivering the modified verbal record to a recipient.

In at least one embodiment of a computer-implemented method of processing dictation, the processor may be capable of extracting at least acoustic feature, and converting the verbal record into a text format, such as XML format. The processor may additionally be capable of extracting one first feature from the subset of the plurality of verbal records, where the at least one first feature is selected from a group consisting of a target word, a word stem, a number of syllables, a syllable duration, a pause duration, and pitch value, or a combination thereof. Further, the processor may also be capable of using the at least one first feature to determine a position of a punctuation feature in the subset of the plurality of verbal records and to introduce the punctuation feature at the determined position. Additionally, the processor may be capable of using the at least one first feature from the at least one verbal record to introduce at least one heading, at least one numbered list, and at least one capitalization of an identified word into the at least one verbal record.

In at least one embodiment of a computer-implemented method of processing dictation, the processor may be capable of extracting at least one second feature from the at least one verbal record, the at least one second feature selected from the group consisting of a part of speech tag, a chunk parse, a target word, a word stem, a number of syllables, a syllable duration pause, a duration and pitch value, or a combination thereof. The step of modifying the identified subset of verbal records may include processing of the subset of records through the use of the at least one first feature or second feature to include the addition of a processed component to the verbal record, where the processed component (such as a period, a comma, a flagged heading, a flagged numbered list, and a capitalization change) selected from a group consisting of a period, a comma, and a capitalization change. The at least one reasoning approach may in at least one embodiment be selected from the group consisting of a heuristic heading detection algorithm, a heuristic numbered list detection algorithm, a memory-based learner using Levenshtein distance metric and a memory based learner using overlap distance metric.

In at least one embodiment of a computer-implemented method of processing dictation, the method may further comprise the step of receiving at least one verbal expression from a participant and processing the at least one verbal expression to generate a candidate rating for the participant. Moreover, a computer-implemented method of processing dictation may additionally comprise the step of adjusting at least one parameter used to process the verbal record based on the candidate rating.

In at least one embodiment of the present disclosure, a method for language detection recognition and common phrase detection, includes identifying a training set and test set, finding possible phrases, finding alternate phrases, determining accuracy of phrases, and determining best parameters.

In at least one embodiment of the present disclosure, a method for language detection recognition and automatic document identification document identification getting data and extracting vectors, creating classifiers, creating boosted classifiers, finding best classifiers, adjusting vector weights, finding confidences, and saving output.

In at least one embodiment of the present disclosure, a method for performing classification includes extracting a feature vector, getting boosted classifier(s), classifying, saving a result, and routing appropriately.

BRIEF DESCRIPTION OF THE DRAWINGS

The features and advantages of the present disclosure, and the manner of attaining them, will be more apparent and better understood by reference to the following descriptions taken in conjunction with the accompanying figures, wherein.

DETAILED DESCRIPTION

Figure 1:
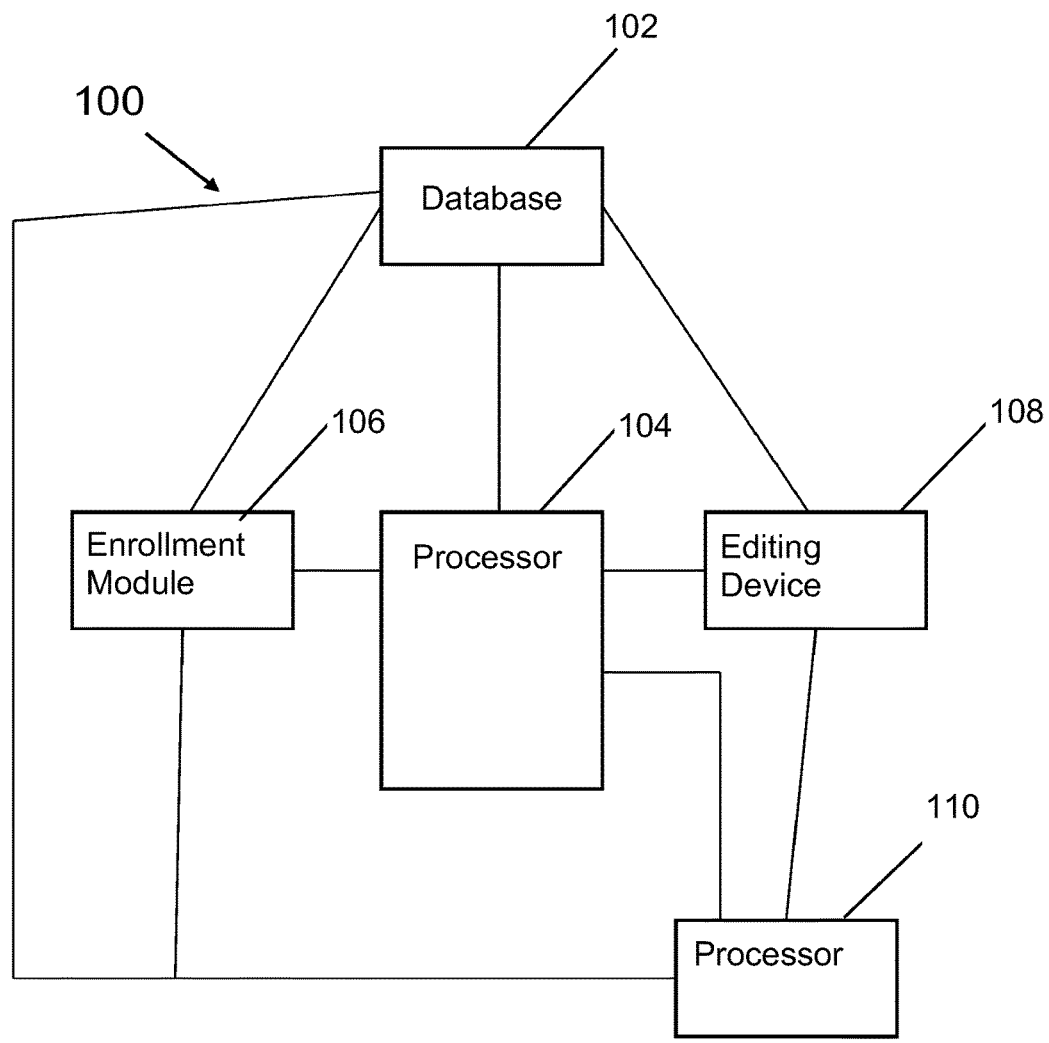
FIG. 1 shows a schematic drawing of an exemplary embodiment of a system for analyzing verbal records, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

At least one embodiment of the present disclosure is a system for analyzing and processing verbal records, where the system comprises a verbal record repository capable of storing at least one verbal record that comprises at least one feature. The system for analyzing and processing verbal records further comprises a verbal cue processing system in communication with the verbal record repository, where the verbal cue processing system is operable to retrieve at least one verbal record, and process at least one feature of the verbal record according to a reasoning approach to generate at least one processed verbal record.

I. System for Analyzing Verbal Records

Turning to FIG. 1, at least one embodiment of a system for analyzing verbal records to provide a desired outcome is depicted. The system 100 comprises a database 102 capable of receiving a plurality of verbal records, where the verbal records comprise at least one identifier and at least one verbal feature, and a processor 104 operably coupled to the database 102. The processor has and executes a software program operational to (1) identify a subset of the plurality of verbal records from the database, (2) analyze the at least one verbal feature of the subset of the plurality of verbal records, (3) process the subset of the plurality of records using the analyzed feature according to at least one reasoning approach, (4) generate a processed verbal record using the processed subset of the plurality of records, and (5) deliver the processed verbal record to a recipient.

In at least one embodiment of system 100, the system is capable of identifying a subset of the plurality of verbal records using processor 104. The identification method may in at least one exemplary embodiment use at least one identifier and/or at least one verbal feature to identify a subset of the verbal records. An exemplary embodiment of an identifier in a verbal record may comprise one or more of a name, date, time of record, word count, reference identification number, owner, or other identifying reference suitable to distinguish the verbal record in a database. Further, an exemplary identifier may also comprise one or more of a bar code, serial number, or radio-frequency identification (RFID).

System 100, in at least one embodiment, may be capable of analyzing a verbal feature, such as at least one acoustic feature, at least one first feature, and/or at least one second feature from the at least one verbal record. The at least one acoustic feature may, for example, be a waveform. An exemplary at least one first feature may be selected from a group consisting of a word feature, such as a target word, a word stem, or combination thereof, or a phonetic feature, such as a number of syllables, a syllable duration pause, duration and pitch value, or a combination thereof. An exemplary at least one second feature may be selected from a group consisting of a part of speech tag, a chunk parse target word, a word stem, a number of syllables, a syllable duration pause, and duration and pitch value, or a combination thereof.

Additionally, system 100 may be capable of using the at least one first feature and/or second feature to determine a position of a punctuation feature in the subset of the plurality of verbal records and introduce the punctuation feature at a determined position. Further, system 100 may also be able to use at least one first feature to introduce at least one heading, at least one numbered list, at least one medication list, and/or at least one capitalization of an identified word into the subset of the plurality of verbal records.

The system 100 may also be operational to process the subset of the plurality of records using at least one first feature and/or at least one second feature according to at least one reasoning approach. The at least one reasoning approach may in at least one embodiment be selected from the group consisting of (1) a heuristic heading detection algorithm, (2) a heuristic numbered list detection algorithm, (3) a memory-based learner using a Levenshtein distance metric, and (4) a memory based learner using an overlap distance metric.

According to at least one embodiment of the system for analyzing verbal records of the present disclosure, the plurality of verbal records may have been previously edited, for example by at least one transcriptionist.

In an exemplary embodiment of the system for analyzing verbal records of the present disclosure, the system may also comprise an enrollment module 106 capable of receiving at least one verbal expression of a participant and processing the at least one verbal expression to generate a candidate rating for the participant. The at least one verbal expression may be selected from the group consisting of an audio characteristic and a content characteristic. Further, the processor may additionally be capable of receiving the candidate rating and adjusting at least one parameter used to process the subset of the plurality of verbal records based on the candidate rating.

In at least one embodiment of the system for analyzing verbal records, the system may further comprise an editing device 108 in communication with the processor 104 (and optionally database 102), the editing device 108 being capable of receiving at least one processed verbal record from processor 104. Moreover, the editing device 108 may also be capable of accepting at least one command from a user, wherein the at least one command modifies the at least one processed verbal record.

According to at least one embodiment of the system for analyzing verbal records, the system 100 may also comprise a connection to at least one additional processor 110 capable of receiving a processed verbal record or other information, monitoring one or more aspect of system 100, and introducing commands or other information to system 100. In at least one exemplary embodiment, each of components 102-110 of system 100 may be operably coupled.

II. Computer-Implemented Method of Processing Dictation

At least one embodiment of the present disclosure is a computer-implemented method of processing dictation, where the method comprises the steps of introducing at least one verbal record to an embodiment of a system for analyzing and processing verbal records, generating at least one processed verbal record with the system for analyzing and processing verbal records, and providing the at least one processed verbal record to a computer in communication with the verbal cue processing system.

Figure 2:
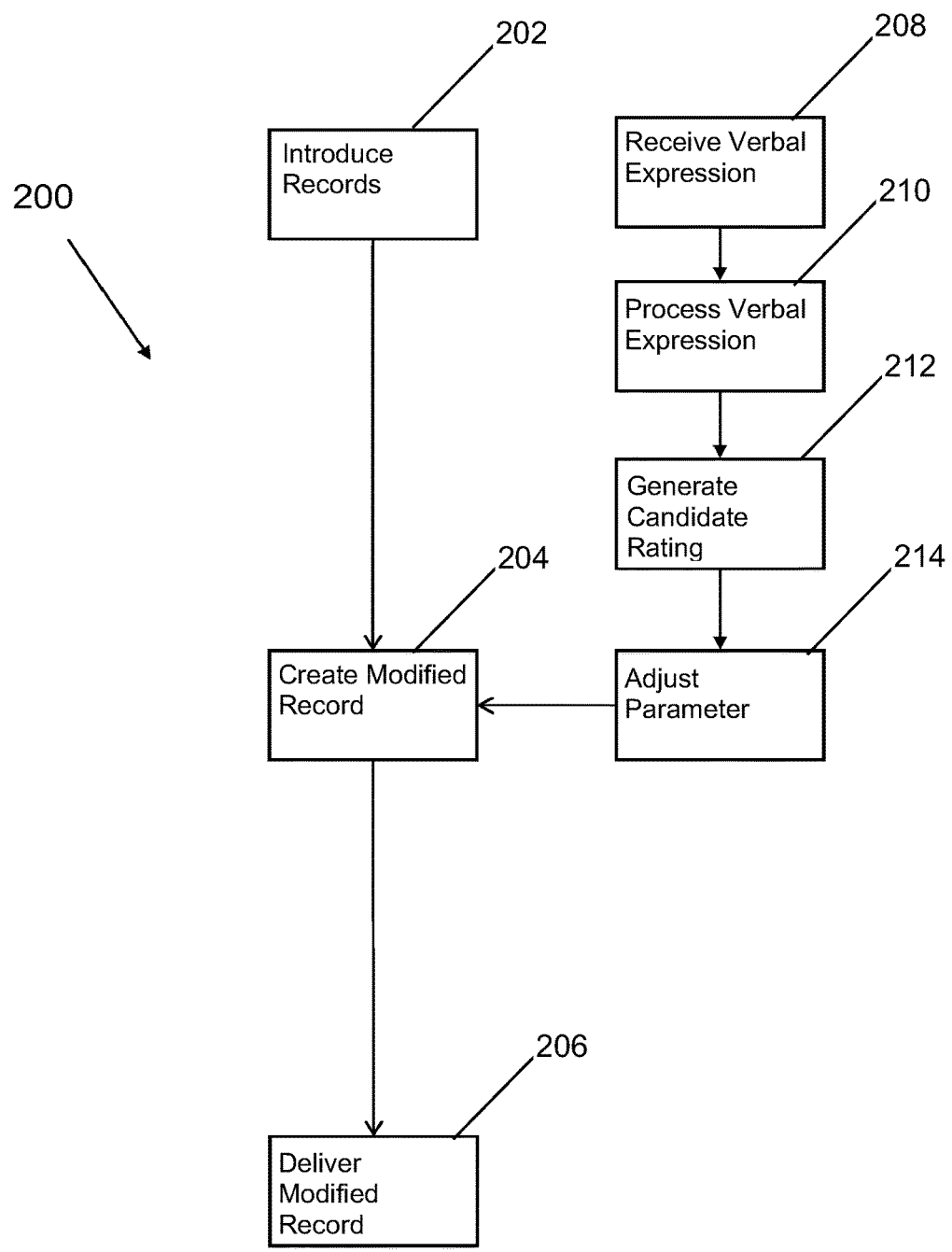
FIG. 2 shows a flowchart of at least one embodiment of a computer-implemented method of processing dictation, according to the present disclosure.
Figure 8:
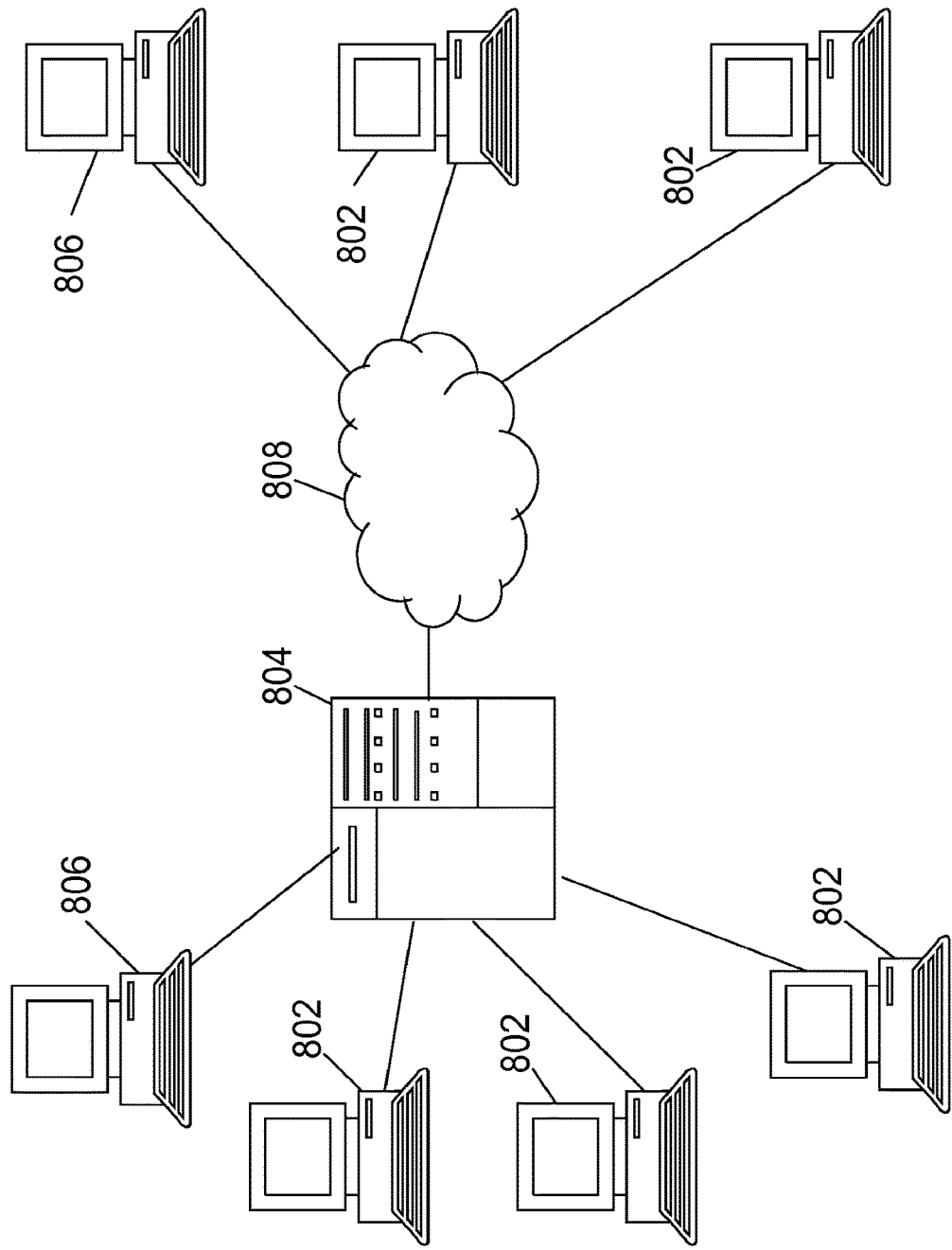
FIG. 8 shows an exemplary system framework according to an embodiment of the present disclosure.

Turning to FIG. 2, at least one embodiment of a computer-implemented method of processing dictation 200 is depicted. Exemplary method 200 comprises the steps of introducing a plurality of verbal records, which may optionally have been, at least in part, edited by at least one transcriptionist, to an embodiment of a system for analyzing verbal records of the present disclosure to provide a desired outcome (exemplary introducing step 202). The method of processing dictation 200 may also comprise the steps of modifying the identified subset of the plurality of verbal records with the system to create a modified verbal record (exemplary modifying step 204), wherein the system uses the at least one analyzed verbal feature and at least one reasoning approach to generate the modified verbal record, and delivering the modified verbal record to a recipient (exemplary delivering step 206). In an exemplary embodiment of delivering step 206, the modified verbal record may be delivered through any appropriate electronic means (such as through an aspect of system 800 as seen in FIG. 8) to a recipient (such as for example, a medical professional, database user, or a transcriptionist).

In at least one embodiment of a computer-implemented method of processing dictation 200, the method 200 may further comprise the step of receiving at least one verbal expression from a participant (exemplary receiving step 208) and processing the at least one verbal expression (exemplary processing step 210) to generate a candidate rating for the participant (exemplary generating step 212). Moreover, the method 200 may additionally comprise the step of adjusting at least one parameter used to process the verbal record based on the candidate rating (exemplary adjusting step 214). The candidate rating and at least one parameter produced by method 200 may be stored in at least one embodiment of database 102.

Figure 3:
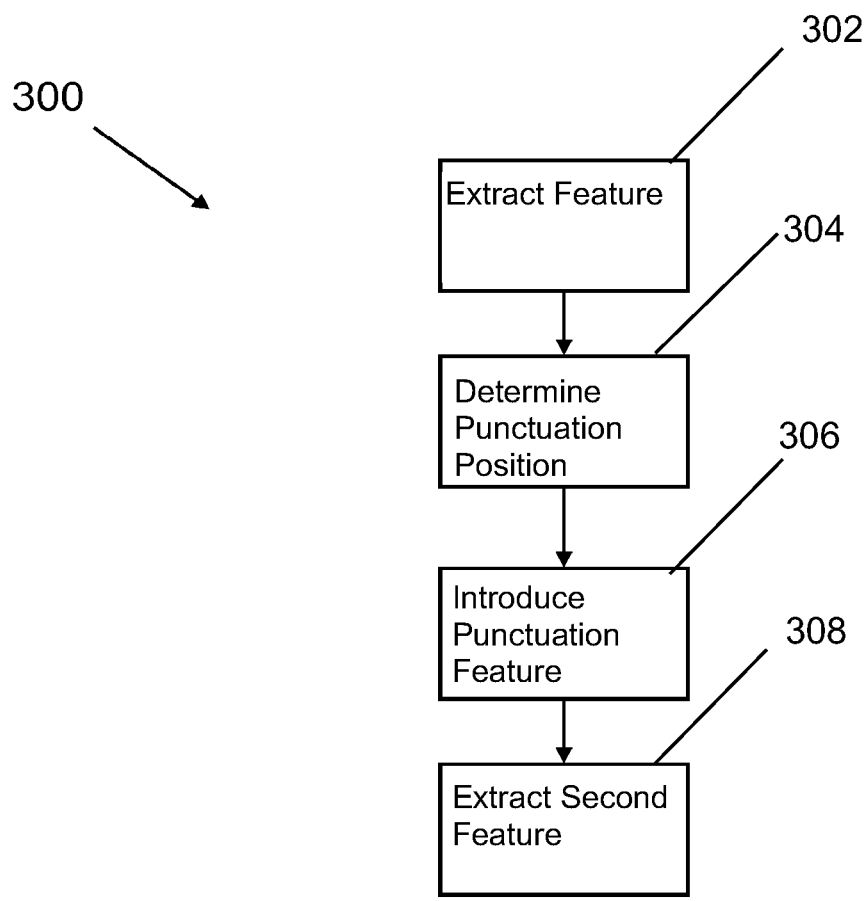
FIG. 3 shows a flowchart of at least one embodiment of a computer-implemented method of processing dictation, according to the present disclosure.

In at least one embodiment of a computer-implemented method of processing dictation 300 (See FIG. 3), the processor may be capable of identifying and extracting at least one first feature from the subset of the plurality of verbal records (exemplary identifying step 302), where the at least one first feature is selected from a group consisting of a target word, a word stem, a number of syllables, a syllable duration, a pause duration, and pitch value, or a combination thereof. Further, the processor may also be capable of using the at least one first feature to determine a position of a punctuation feature in the subset of the plurality of verbal records (exemplary determining step 304) and to introduce the punctuation feature at the determined position (exemplary introducing step 306). Additionally, the processor may be capable of using the at least one first feature from the at least one verbal record to introduce at least one heading, at least one numbered list, and at least one capitalization of an identified word into the at least one verbal record.

In at least one embodiment of a computer-implemented method of processing dictation 300, the processor may be capable of extracting at least one second feature from the at least one verbal record (exemplary extracting step 308), the at least one second feature selected from the group consisting of a part of speech tag, a chunk parse, a target word, a word stem, a number of syllables, a syllable duration pause, a duration and pitch value, or a combination thereof.

III. Aspects of Systems and Methods

A. Verbal Records

A plurality of verbal records according to an exemplary embodiment of the present disclosure may comprise any type of verbal recording or translation to text thereof. For example, a plurality of verbal records may contain any number of unprocessed verbal recordings, verbal recordings processed through an automatic speech recognition engine, or a copy of any one of the verbal recordings described herein translated into a text format. Further, a plurality of verbal records may include sets of verbal records designated for training and/or a set of verbal recordings designated for evaluation purposes.

Figure 4:
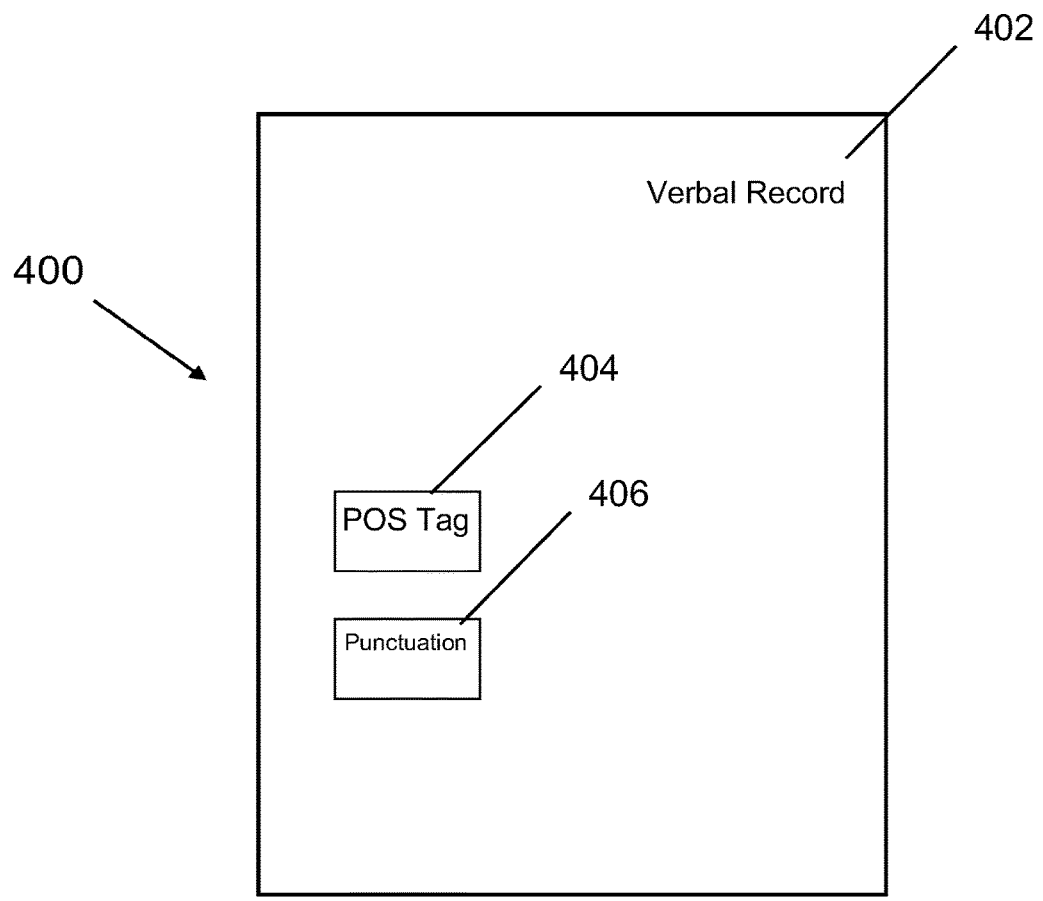
FIG. 4 shows a schematic drawing of an exemplary embodiment of a system for analyzing verbal records, according to the present disclosure.

Turning to FIG. 4, exemplary verbal records 402, of an embodiment of a system for analyzing verbal records 400, designated, or amended, for training according to an embodiment of the present disclosure may include one or more part-of-speech (POS) tag 404. Further, the verbal records 402 may additionally comprise punctuation 406, such as commas and periods. In at least one embodiment, verbal records 402 labeled for training may be processed (such as by embodiments of a system of the present disclosure) in duplicate with only one copy of the duplicate record being processed to include punctuation. For a first training record of feature instances, according to an embodiment of the present disclosure, features can simply be extracted from the post-regular expression (regex) file. For the second training record, the same post-regex file may be used as in the first training record, followed by processing with a POS tagger, a chunk parser, and then the extraction of appropriate features.

B. Format

According to at least one embodiment of the present disclosure, the verbal record may be translated using an embodiment of a system for analyzing verbal records of the present disclosure. The translated record may in some instances be compared and/or aligned to a translation performed by one or more transcriptionist. In at least one embodiment, the translated record from an embodiment of the system and/or method of analyzing verbal records as described herein is in XML format.

C. Regular Expression Matching

Figure 5:
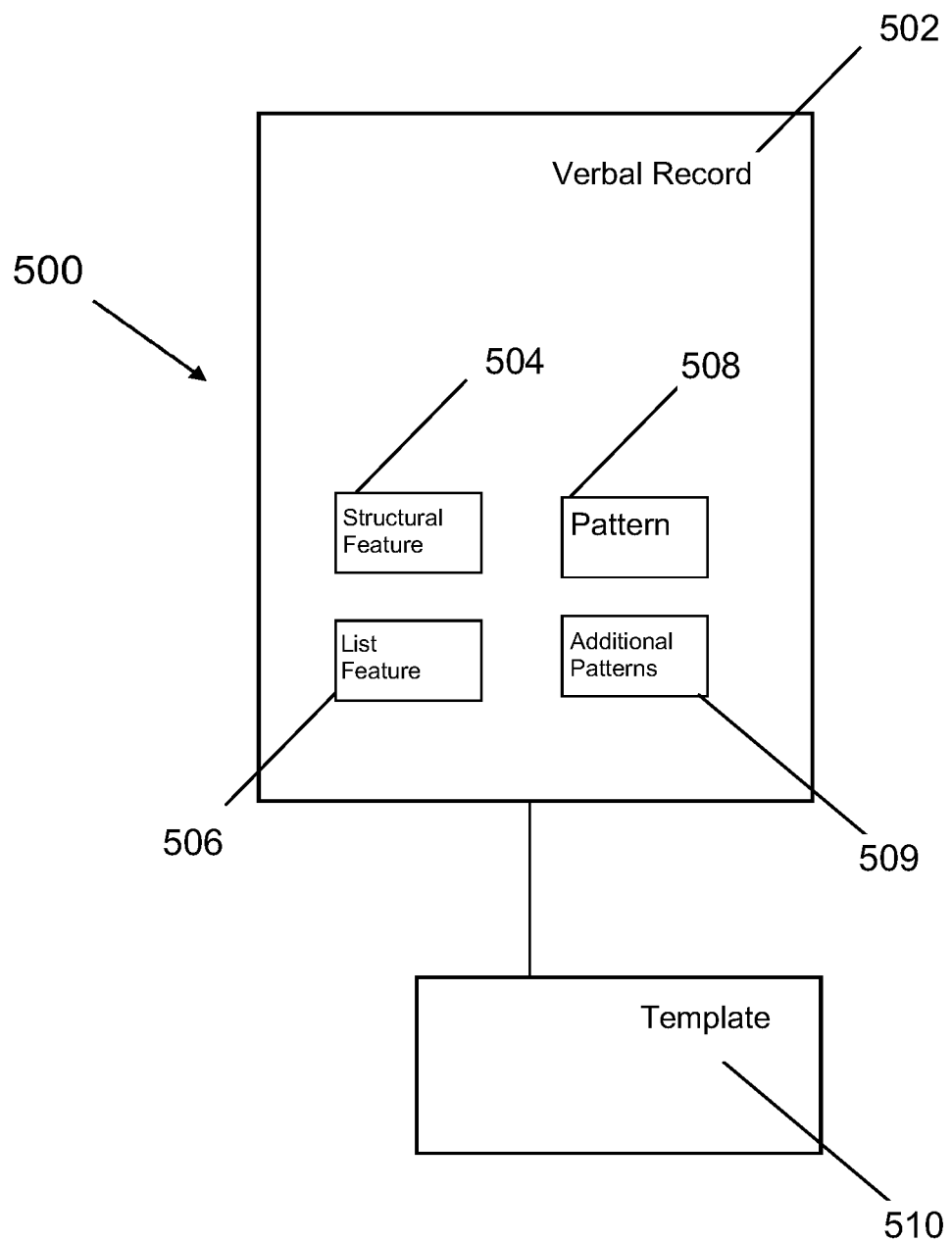
FIG. 5 shows a schematic drawing of an exemplary embodiment of a system for analyzing verbal records, according to the present disclosure.

In at least one embodiment of a system for analyzing verbal records 500, as seen in FIG. 5, the system 500 may be capable of processing a subset of verbal records 502 through modification of the verbal (or text translated) record 502 by adding or subtracting a structural feature 504 or a list feature 506. The processor of an embodiment of a system for analyzing verbal records may look for at least one pattern 508. Exemplary patterns 508 according to the present disclosure may include information such as punctuation, headings, medical or legal terms, numbers, quantity indicators, frequencies, durations, and indications of a number.

The verbal record 502 from which at least one pattern 508 is identified may be modified to indicate the presence of a pattern 508 and the location within the verbal record 502 of the pattern 508. Additionally, the at least one pattern 508 may be used singly, or in combination with additional patterns 509, to identify the location of a structural feature 504 or list feature 506. Further, the at least one pattern 508 may be used in combination with a template 510 or library of templates to determine the appropriate structural feature or list feature for use with the applicable verbal record 502.

Figure 6:
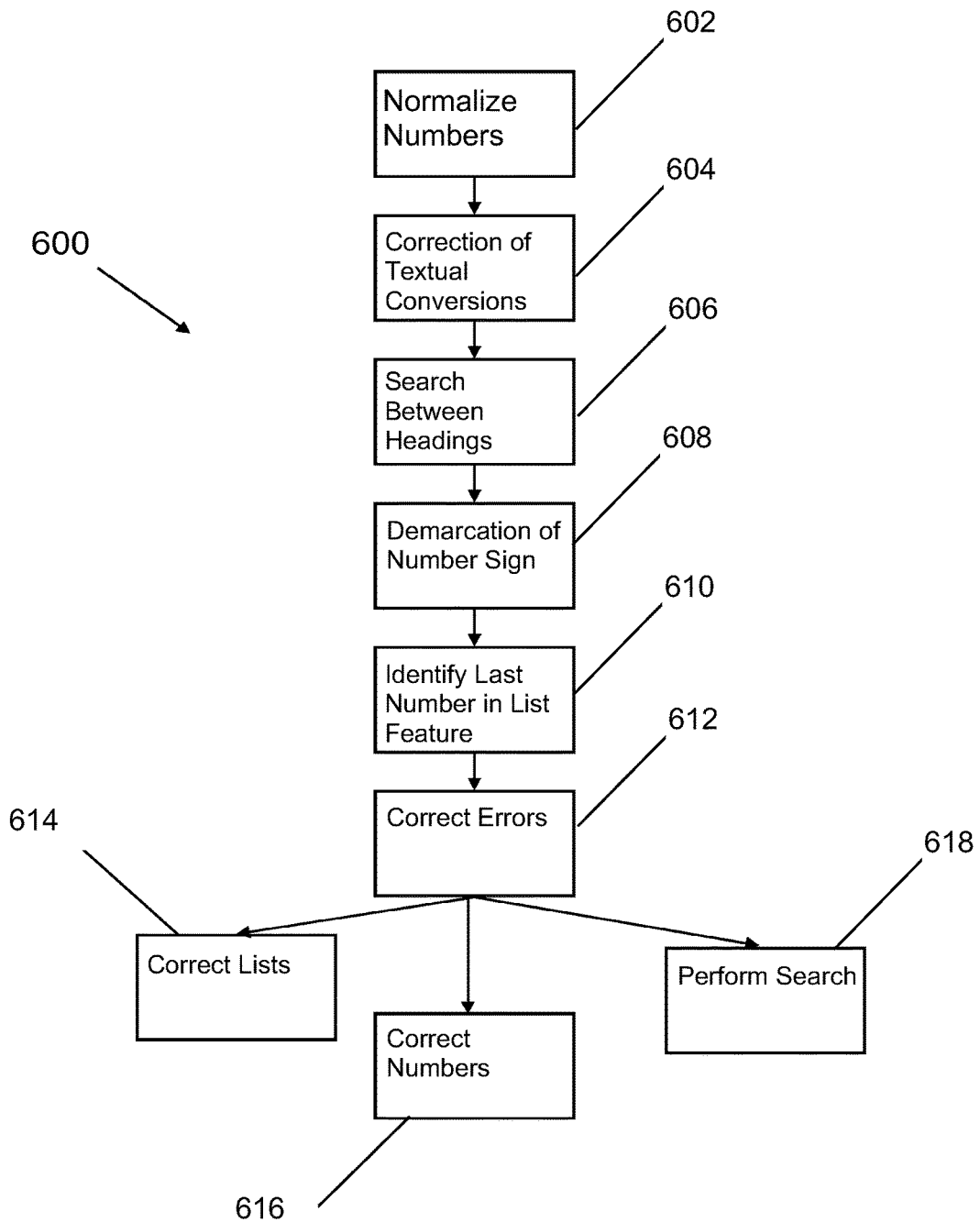
FIG. 6 shows a flowchart of at least one embodiment of a computer-implemented method of processing dictation, according to the present disclosure.

Turning to FIG. 6, an embodiment of a verbal record having an a verbal feature identifying a list feature, may be adapted to incorporate the list feature, in an embodiment of a method for analyzing verbal records 600 of the present disclosure. The steps in the adaption method may include normalizing some or all of the identified numbers into a common format (such as one to 1) (exemplary normalizing step 602), correction of simple textual conversions 604 (such as #for to #4) (exemplary correction step 604), searching between headings to a numerical indicator (# or number) followed by a number (exemplary searching step 606). Following the identification of a numerical indicator followed by a number, the first number sign may be demarked as the beginning of a list (exemplary demarcation step 608) and the last identified number in the list feature is identified as the end of the list (exemplary identifying step 610). Following the identification of the list, errors are corrected in at least one exemplary embodiment (exemplary correction step 612).

Exemplary embodiments of method 600 may also comprise one or more additional modification steps 614-618. First, lists which do not start with "1" are corrected (exemplary correction step 614). Second, numbers which are missing from the normal progression in as identified in the list are added where missing (exemplary addition step 616). Lastly, a search may be performed between the end of the list and the next identified structural feature (such as a heading) (exemplary searching step 618).

In an exemplary embodiment of a method of the present disclosure, medication lists as found in at least one verbal record are identified by searching the record between identified headings to find the number of times that a medication, a quantity, or a frequency is detected. In at least one embodiment, if there is at least one medication present between headings, along with one or more frequency or quantity, then a medication list is designated.

D. Feature Extraction

According to at least one aspect of a verbal feature of the present disclosure, the verbal feature may be a word feature or a phonetic feature, such as those included in Table 1. In an exemplary embodiment, a word feature may include a target word and/or a word stem, and a phonetic feature may include a defined number of syllables, a syllable duration ratio (calculated by dividing the duration of the word by the number of syllables), pause duration (the pause between a target word and the next word), and a pitch value. For at least one embodiment, the pitch (F0) value may be determined between every 5 milliseconds and 20 milliseconds, such as about every 10 milliseconds. From the F0 measurements, variables are determined, which include the (1) maximum F0 of the target, (2) minimum F0 of the target, (3) the change in F0 (delta F0) between the previous word to the target word, and (4) the F0 change at the final boundary of each word (boundary F0)

TABLE 1

| Features | |
|---|---|
| Feature Number | Feature Name |
| 1-5 | The window of 5 words |
| 6-10 | POS |
| 11-15 | Stems |
| 16 | The number of syllables in the 3rd word |
| 17 | The ratio 3rd word's syllable duration to the average of the previous 10 |
| 18 | The pause duration after the 3rd word |
| 19 | The difference between the MaxF0 of the 2nd word and the 3rd word (DeltaF0) |
| 20 | The Maximum F0 of the 3rd word |
| 21 | The Minimum F0 of the 3rd word |
| 22 | The F0 change in the 3rd word boundary |
| 23 | The number of syllables in the 4th word |
| 24 | The ratio of 4th word's syllable duration to the average of the previous 10 |
| 25 | Delta F0 of the 4th word |
| 26 | Max F0 of the 4th word |
| 27 | does this line have chunk information: yes |

TABLE 1-continued

| Features | |
|---|---|
| Feature Number | Feature Name |
| 28 | does this line start with a shallow-level chunk: nx |
| 29 | does this line start with a deep-level chunk: nx |
| 30 | does this line end with a shallow-level chunk: no |
| 31 | does this line end with a deep-level chunk: no |
| 32 | The presence of punctuation after the 3rd word (class) |

1-15: Words, POS, Stems

Features 1-5 are illustratively five (5) word windows that are looked at for each instance In at least one embodiment of a system of method of the present disclosure, an instance may be an identified subset of verbal records. Features 6-10 and 11-15 are the part of speech (POS) tags and stems of the same five words, respectively. The POS may tell how the word is used, i.e. verb, noun, adjective, etc. The stems are the roots of the words with any suffixes removed from the ends. For example, should the actual point of possible punctuation be between words 3 and 4, so it may be expected that words closer to that will be more important to the processor in making its decisions. In such an example, features 1, 5, 11, and 15, may be ignored so that the system may only need to consider the POS of the words at either end of the window. In at least one embodiment, feature 7 may be ignored as well as the POS of the second word, feature 13, and the stem of the third word. Only for the fourth word, the word after the target for punctuation, all of the "word" features are considered. The same combinations are used for each of the features in all three of the tests in Table 2.

16-26: Phonetic Features

The phonetic features may be broken down into two categories: those that deal with speech rate, and those that deal with fundamental frequency (F0) or tone. In at least one specific embodiment, all of these features deal with either the 3rd word (features 16-22) or the 4th word (23-26) in the window. Generally, the same combinations for these features are used regardless of which training method is being employed for a given test with one illustrative exception. Feature 16, the number of syllables in the third word, may be ignored in either case, as are 20-21, the maximum and minimum F0 for the third word. These features, in at least one embodiment, may be extracted for the purpose of constructing other features, namely features 17 and 19 (technically, the minimum F0 was not needed for feature 19). For the "LODO-trained" tests feature 23 was also ignored. For the "self-trained" tests, feature 26 was again ignored.

27-31: Syntactic Features

In an exemplary embodiment, features 27-31 may provide an embodiment of the processor with syntactic information about the instance in question. All of these aforementioned features may prove to be useful in all testing conditions.

E. Formatting

Figure 7:
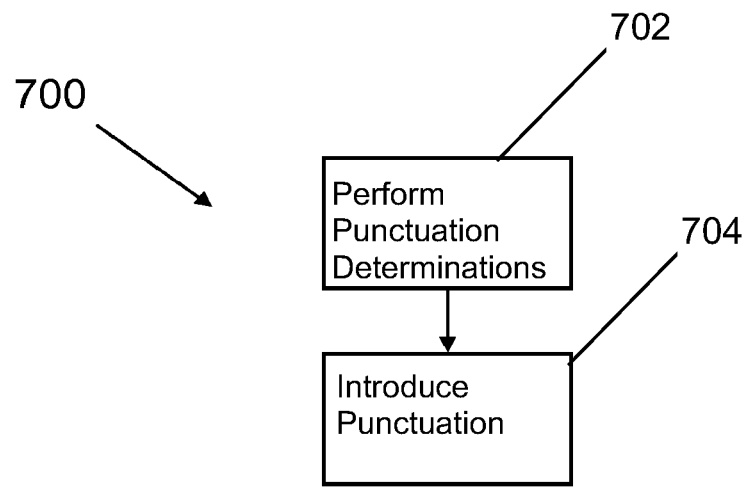
FIG. 7 shows a flowchart of at least one embodiment of a computer-implemented method of processing dictation, according to the present disclosure.

According to at least one embodiment of the method of processing dictation 700 according to the present disclosure (See FIG. 7), initial punctuation and formatting determinations are made (exemplary determination step 702). Following the determination of POS tags and chunks, according to at least one embodiment, an initial punctuation is introduced (exemplary introduction step 704).

An exemplary computer-implemented method of processing dictation 200 may be used in several different technology and service areas. For example, exemplary method 200 may be used in healthcare applications, such as medical dictation, legal transcription, automatic real-time voice translation, call routing, voice dialing, and content-based audio search.

The various systems of the present disclosure may operate on a computer network with one or more of the features shown in FIG. 8. As shown in exemplary system framework 800 shown in FIG. 8, one or more user computers 802 may be operably connected to a system server 804. A user computer 802 may be a computer, computing device, or system of a type known in the art, such as a personal computer, mainframe computer, workstation, notebook computer, laptop computer, hand-held computer, wireless mobile telephone, personal digital assistant device, and the like.

One or more administrator computers 806 may also be operably connected to system server 804 including through a network 808 such as the Internet. Administrator computers 806, similar to user computers 802, may be computers, computing devices, or systems of a type known in the art, such as a personal computers, mainframe computers, workstations, notebook computers, laptop computers, hand-held computers, wireless mobile telephones, personal digital assistant devices, and the like. In addition, user computers 802 and administrator computers 806 may each comprise such software (operational and application), hardware, and componentry as would occur to one of skill of the art, such as, for example, one or more microprocessors, memory, input/output devices, device controllers, and the like. User computers 802 and administrator computers 806 may also comprise one or more data entry means (not shown in FIG. 8) operable by a user of client computer and/or an administrator computer, such as, for example, a keyboard, keypad, pointing device, mouse, touchpad, touchscreen, microphone, and/or other data entry means known in the art. User computers 802 and administrator computers 806 also may comprise an audio display means (not shown in FIG. 8) such as one or more loudspeakers and/or other means known in the art for emitting an audibly perceptible output. The configuration of user computers 802 and administrator computers 806 in a particular implementation of one or more systems of the present disclosure is left to the discretion of the practitioner.

System server 804 may comprise one or more server computers, computing devices, or systems of a type known in the art. System server 804 may comprise server memory. System server 804 may comprise one or more components of solid-state electronic memory, such as random access memory. System server 804 may also comprise an electromagnetic memory such as one or more hard disk drives and/or one or more floppy disk drives or magnetic tape drives, and may comprise an optical memory such as a Compact Disk Read Only Memory (CD-ROM) drive. System server 804 may further comprise such software (operational and application), hardware, and componentry as would occur to one of skill of the art, such as, for example, microprocessors, input/output devices, device controllers, video display means, and the like.

System server 804 may comprise one or more host servers, computing devices, or computing systems configured and programmed to carry out the functions allocated to system server 804. System server 804 may be operated by, or under the control of, a "system operator," which may be an individual or a business entity. For purposes of clarity, system server 804 is shown in FIG. 8 and referred to herein as a single server. System server 804 need not, however, be a single server. System server 804 may comprise a plurality of servers or other computing devices or systems connected by hardware and software that collectively are operable to perform the functions allocated to the various systems of present disclosure. Specifically, system server 804 may be operable to be a web server, configured and programmed to carry out the functions allocated to a system server according to the present disclosure. Further, although user computers 802 and administrator computers 806 may be connected directly to system server 804, these computers may be connected to system server 804 through any suitable network such as network 808. Further, in one embodiment, the users need not be provided access to system server 804 but instead the content posts from users are made by the user(s) and saved to one or more particular locations and the posts are accessed or harvested by the administrator or system automatically.

System server 804 may be operably connected to the various user computers 802 and/or an administrator computers 806 by network 808, which in an embodiment of the present disclosure comprises the Internet, a global computer network. However, network 808 need not comprise the Internet. Network 808 may comprise any means for electronically interconnecting system server 804 and a user computer 802 and/or an administrator computer 806. Thus, it will be appreciated by those of ordinary skill in the art that the network 808 may comprise the Internet, the commercial telephone network, one or more local area networks, one or more wide area networks, one or more wireless communications networks, coaxial cable, fiber optic cable, twisted-pair cable, the equivalents of any of the foregoing, or the combination of any two or more of the foregoing. In an embodiment where system server 804 and user computer 802 and/or an administrator computer 806 comprise a single computing device operable to perform the functions delegated to both system server 804 and user computer 802 and/or an administrator computer 806 according to the present disclosure, network 808 comprises the hardware and software means interconnecting system server 804 and user computer 802 and/or an administrator computer 806 within the single computing device. Network 808 may comprise packet switched facilities, such as the Internet, circuit switched facilities, such as the public switched telephone network, radio based facilities, such as a wireless network, etc.

The various systems, methods, schema, ontologies, and architectures of the present disclosure may be used for purposes outside of the medical transcription field as referenced in the various examples cited herein. For example, the system for analyzing verbal records may comprise various components and relationships suitable for use in any number of areas where various experiences are utilized and processed, with feedback being fed back into system componentry to improve overall system outcomes. In addition, various components described herein may share a name (or a portion thereof) but have duplicative reference numbers, and therefore the descriptions for the various components should read in view of one another.

In addition, and regarding the various systems of the present disclosure, such systems may be operable, as desired by a user of such systems, to generate visual, electronic (video, audio, database, transcript, etc.), and/or printed reports, outputs, outcomes, and the like. Such exemplary outputs may be used for any number of purposes, and may be useful generally to "report" results, data, and/or knowledge contained within and generated from such systems. Furthermore, the disclosure of the present application further encompasses uses of the various methods, systems, architectures, etc., to perform various tasks in connection therewith.

While various embodiments of systems for analyzing verbal records and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

for all tests we have run to this point. The decision about the global metric for this dataset, despite the range of options available to an embodiment of the processor, is essentially binary: overlap or Levenshtein Distance. These two metrics can both produce acceptable results, depending on a number of factors. The metric is controlled using the –m ӏ v ᴌ (in this case the value should be either L for Levenshtein Distance or O for overlap) in the command line call. The amount of training data available/employed in the test should be considered when making this decision. Generally for our data, overlap performs better with large amounts of training data, whereas Levenshtein can perform well with smaller or larger amounts. Another potentially important factor is time. Running identical tests, changing only the metric as in tests 2 and 3 from Table 2, overlap tests will go much faster than Levenshtein.

Levenshtein Distance can produce the best results for some doctors, and overlap for others. As you can see in Table 2, doctors A, D, E, F, G, H, and K have better results for the overlap tests, but Doctors B, J, and M have better results in the Levenshtein test. For some doctors, the difference is negligible, but for doctors like F and B, there is quite a difference.

Figure 9:
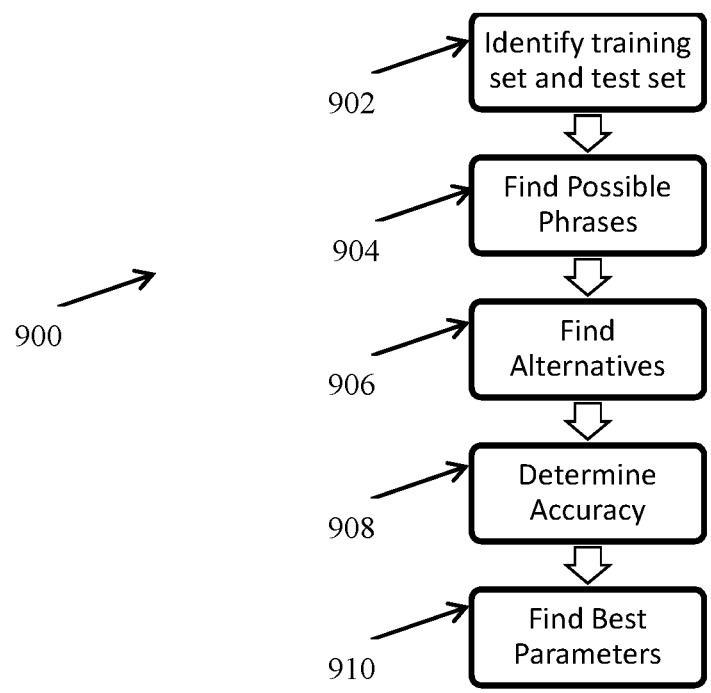
FIG. 9 shows a flowchart of at least one embodiment of a computer-implemented method of processing dictation, according to the present disclosure.

Referring now to FIG. 9, it is shown a method for language detection recognition and common phrase detection, generally indicated at 900. According to at least one embodiment of the present disclosure, the method 900 includes step 902 of identifying a training set and test set;

Example

TABLE 2

Individual Results by Test

| | Test 1[a] | | | Test 2[b] | | | Test 3[c] | | |
|---|---|---|---|---|---|---|---|---|---|
| | Recall | Precision | F-Score | Recall | Precision | F-Score | Recall | Precision | F-Score |
| Subject A | 31.12 | 70.59 | 56.29 | 28.57 | 94.11 | 64.50 | 25.00 | 93.33 | 60.33 |
| Subject B | 27.81 | 72.95 | 55.06 | 25.00 | 75.00 | 53.55 | 30.55 | 84.61 | 62.47 |
| Subject C | 34.80 | 83.85 | 65.38 | 27.27 | 91.30 | 62.10 | 24.67 | 100.00 | 62.06 |
| Subject D | 25.03 | 93.10 | 60.28 | 53.84 | 87.50 | 77.77 | 46.15 | 90.00 | 75.61 |
| Subject E | 41.97 | 94.30 | 75.46 | 42.85 | 94.73 | 76.25 | 40.47 | 94.44 | 74.53 |
| Subject F | 38.47 | 84.54 | 68.20 | 25.71 | 100.00 | 63.36 | 20.00 | 87.50 | 52.23 |
| Subject G | 37.09 | 96.84 | 73.21 | 51.28 | 90.90 | 78.72 | 33.33 | 92.85 | 68.39 |
| Subject H | 21.62 | 77.23 | 50.97 | 57.92 | 89.07 | 80.40 | 50.81 | 92.07 | 79.20 |
| Subject I | 40.27 | 92.75 | 73.56 | 64.77 | 89.06 | 82.84 | 53.40 | 95.91 | 82.73 |
| Subject J | 26.03 | 73.70 | 53.92 | 50.00 | 88.23 | 76.51 | 53.33 | 88.88 | 78.39 |
| Subject K | 38.39 | 95.64 | 73.64 | 38.09 | 100.00 | 75.46 | 33.33 | 77.77 | 61.39 |
| Subject L | 42.30 | 90.16 | 73.50 | 18.75 | 81.81 | 48.87 | 16.66 | 88.88 | 47.58 |
| Subject M | 46.81 | 91.77 | 76.69 | 65.00 | 86.66 | 81.23 | 63.75 | 91.07 | 83.87 |
| Mean Avg | 34.74 | 85.95 | 65.87 | 42.23 | 89.87 | 70.88 | 37.80 | 90.56 | 68.36 |

[a]LODO-training with settings: -mO: I1, 5, 7, 11, 13, 15-16, 20-21, 23, 30 -k9 -dID
[b]self-trained with settings: -mO: I1, 5, 7, 11, 13, 15-16, 20, 21, 26, 30 -k9 -dID
[c]self-trained with settings: -mL: I1, 5, 7, 11, 13, 15-16, 20, 21, 26, 30 -k9 -dID Table 2 provides results for all doctors for three different tests. One utilizing the overlap metric and "LODO-training" in the first column, one using overlap and "self-training" in column two, and the final combines "self-training" with Levenshtein Distance. The table shows the recall, precision, and precision-weighted f-score, in percentages, for all doctors for each test, as well as the combined results for each test. These results reflect the at least one settings for each type of test on our data to date.

When considering which settings may optimize transcription results, the tests in Table 2 will be referred to. It is possible to get better results for a single doctor at a time with different combinations of settings and features. The default settings of the IB1 nearest neighbor algorithm and Gain Ratio feature weighting have proven to be the best settings step 904 of finding possible phrases; step 906 of finding alternate phrases; and step 908 of determining accuracy of phrases; and step 910 of determining best parameters.

In at least one embodiment of the present disclosure, the method 900 includes step 902 of identifying a training set and test set. It will be appreciated that the training set comprises a plurality of verbal records according to an exemplary embodiment of the present disclosure, and may comprise any type of verbal recording or translation to text thereof. For example, a plurality of verbal records may contain any number of unprocessed verbal recordings, verbal recordings processed through an automatic speech recognition engine, or a copy of any one of the verbal recordings described herein translated into a text format. Further, a plurality of verbal records may include sets of verbal records designated for training and/or a set of verbal recordings designated for evaluation purposes. It will be appreciated that t-ft a plurality of verbal records may also be available for evaluation purposes (i.e. the test set). In at least one embodiment of the present disclosure, a large sample of documents is selected (i.e. the body of work). By way of example, certain common phrases appear together very frequently in certain types of documents. Medical documents, for example, are more likely to have predominantly medical terms combined into medically specific phrases (e.g. "Heart Regular rate and rhythm no murmurs or gallops heard"). As such, a body of work comprising medical documents may be considered the large sample of documents for which common phrases are being built. In at least one embodiment of the present disclosure, a completed (transcribed) document is always selected. It will be appreciated that where possible, the speech recognition output (SR) for each sample document is also selected. In at least one embodiment of the present disclosure, a portion of the documents which have SR included (e.g. 25%) are set aside to be used as a test set. The remainder of the documents is flagged as a training set.

In at least one embodiment of the present disclosure, the method 900 includes step 904 of finding possible phrases. In at least one embodiment of the present disclosure, the method 900 will operate to analyze each document individually and compare it to each other document in the training set. For example, the documents in the training set are analyzed to find some possible common phrases. When a common phrase is identified in one document, the plurality of documents in the training set are further analyzed to determine if the common phrases occurs in the remaining documents. It will be appreciated that each of the plurality of documents are individually analyzed and the identified phrases from each of the plurality of documents are analyzed against the other documents in the training set to validate the identified phrases. In at least one embodiment of the present disclosure, the method 900 finds sequences of words which appear in a minimum percentage of the training documents. For example, in most cases, a minimum percentage may begin around 30%. If the training documents are long at a rate of 10% per 1000 words (after the first 1000), the minimum percentage will go up. Continuing with this example, if a training set has an average of 3,500 words per document, the minimum percentage would be 50%. The percentage does not increase higher than 80% in this way. It will be appreciated that the foregoing percentages are non-limiting, and may vary depending on the training documents.

By way of another example, the minimum percentage also increases if there are too many common phrases recognized after step 902. It will be appreciated that the issue in this case is that a large number of common phrases results in extremely long computation times, but generally does not give results better than a smaller set. For instance, if there are more than 1000 phrases after step 902, the min percentage is increased by 5% and step 902 is repeated. This can repeatedly occur until the minimum percentage is at 90%.

It will be further appreciated that the minimum percentage does not actually change depending on the phrase length. This can be attributable to the fact that a lot of medical documents, for example, can have pretty large segments that are standardized (e.g. physical exams, prognosis, procedures, etc.).

It will be appreciated that the location and formatting of the phrase are not considered important. By way of example, consider a body of work that is made up of medical data about a person's History and Physicals (H&Ps). A phrase such as "Heart regular rate and rhythm" may appear in 90% of the exams, and could be a common phrase. Continuing with this example, a phrase such as "The patient is a very poor historian" could also show up in multiple places in a smaller number of documents, but could nonetheless also be a common phrase. In at least one embodiment of the present disclosure, a phrase must meet a certain word length (e.g. a minimum of 5 words) to be qualified as phrase; and cannot exceed a certain word length (e.g. 200 words) as well.

In at least one embodiment of the present disclosure, the method 900 includes step 906 of finding alternative phrases. It will be appreciated that some common phrases can have slight variations between the plurality of documents in the training set. In at least one embodiment of the present disclosure, to find such possible alternatives, all of the completed documents in the training set are analyzed to find phrases which are a "soft match" with the common phrases that have been found. By way of example, the phrase "Heart irregular rate and rhythm," could be an alternative for the phrase "heart regular rate and rhythm;" similarly, the phrase "The patient was cooperative and responsive to my questions," could have an alternative phrase such as "the patient was uncooperative and not responsive to my inquiries." In at least one embodiment of the present disclosure, if a soft match is found, and it is not recorded as some other common phrase, it is recorded as a valid alternative.

In at least one embodiment of the present disclosure, a "soft match" is determined by comparing two groups of words and finding how much overlap there is between the groups of words. In at least one embodiment of the present disclosure, this overlap is expressed as a percentage. By way of example, a comparison between the phrase "The patient presents with," and the phrase "The patient insists with," would be 75%, because of the overlap of three of the four words in the phrases. It will be appreciated that true sub-phrases are identified. A sub-phrase is a phrase that is part of a larger phrase, and where the larger phrase appears in all of the same documents as the smaller phrase. It will be further appreciated that in many cases, there may be sub-phrases which appear in the common phrase set, but these appear in more documents than their longer counterparts. Nonetheless, the sub-phrases are retained because when we are choosing parameters, the sub-phrases are less likely to get weeded out as weak, when compared to the larger ones.

By way of another example, if there are two large phrases that both appear in enough documents, they will both become common phrases even if they have portions/stems that overlap. It will be appreciated that if one does not meet the threshold, then it will likely become an alternative to the one that does. It will be further appreciated that if neither phrase meets the threshold, then they will not end up represented in common phrases.

In at least one embodiment of the present disclosure, partial credit is also given when there is partial overlap between words, such as "patients" and "patient" or "hypothyroid" and "thyroid". By way of example, assuming WORD1 is the shorter of two words, and assuming WORD1 is greater than half the length of WORD2, then they are considered to overlap if:

WORD2 starts with WORD1
WORD2 ends with WORD1
WORD2 starts with the first ¾ths of the letters WORD1
WORD2 ends with the last ¾ths of the letters in WORD1

If any of the above conditions are true, then that match is worth half a point (i.e. partial credit). An exact match is worth 1 point. The confidence of a soft match is equal to the total point divided by the words in a phrase (i.e. total points/words in phrase=% confidence). For example, missing words are evident in the formula above: (total points/words in phrase); if there are words missing from the phrase, then the total points will be lower, which will cause the confidence to be lower.

It will be appreciated that extra words are a little less direct. The maximum number of document words we'll look forward when considering a match is 1.2*the length of the phrase we're matching on. So if there are a lot of extra words inserted into the document which aren't in the phrase, then the soft matcher won't look out far enough to try to make the matches at the end of the phrase. This will also lower the total points and hurt the match confidence.

In at least one embodiment of the present disclosure, extra words and missing words are also handled and incorporated into the confidence returned. By way of an example, extra words are different. The % confidence is actually just part of a structure that is returned when a soft match is performed. The rest of the structure mostly just holds information about where the match is located in the document and which phrase words match with which document words. Based on this, it is possible to compute how many document words such a match spans. For instance if a soft match was found for a common phrase starting at word 343 and ending at word 350, that would span 8 words. By way of another example, when multiple soft matches exist for different common phrases in a document, a decision needs to be made about which to apply, such that matches with the highest 'total points' are preferred first. It will be appreciated that in the event of a tie, matches with the LOWEST word span are preferred next. In the event of another tie, the match with the earliest starting word is preferred. So, extra words are taken into consideration because they increase the word span of a match.

In at least one embodiment of the present disclosure, the method 900 includes step 908 of determining accuracy. It will be appreciated that the method 900 can identify phrases that are similar to other valid parts of SR output. In at least one embodiment of the present disclosure, to avoid overcorrection, the method 900 tests for false positives that would be caused by each phrase. This is performed by testing each phrase against each training document that has SR output. For instance, for each possible phrase in the SR output, a soft match analysis is performed against each common phrase. If there is a soft match against the phrase, then the phrase is replaced by the common phrase and the SR output is correspondingly corrected. It will be appreciated that if the corresponding location in the corrected document is a recorded instance of the phrase or a valid alternative, then it is recorded it as a true positive; otherwise, this is record it as a false positive.

By way of an example, if a common phrase is "Patient presents as a very poor historian," but the dictated phrase is "Patient describes himself as very poor," then four out of seven words match here—"patient," "as," "very," and "poor." Therefore, if the required confidence is very low, this could be a soft match. However, if the dictated text is correct, correcting it to the common phrase based on the weak match would cause a false positive, or overcorrection.

By way of another example, if a common phrase is "Allergies and adverse drug reactions: none," and the dictated phrase is "Allergies and adverse drug reactions: latex," if "latex" never came up as a valid alternative (it was never in a training document) this could now be corrected to: "Allergies and adverse drug reactions: none latex." In this example, this would actually subtract value from the draft output, whereby there is overcorrection when there is a match with a high level of confidence.

In at least one embodiment of the present disclosure, each soft match has a confidence score. When recording true positives (TPs) and false positives (FPs), the confidence score that went with each soft match is tracked. In at least one embodiment of the present disclosure, acceptance levels of FPs can be determined and decided to allow for an acceptable confidence threshold for each common phrase. It will be appreciated that the acceptance levels are part of the parameters that are chosen/tuned against at step 910. It will be further appreciated that currently, FP rates can be tested at 0% and 10% and see which produce the best results. It will be appreciated that these FP rates can be changed in the future to accommodate appropriate confidence thresholds. For a given FP rate (e.g. 10%), the confidence threshold that this corresponds to varies widely from phrase to phrase. By way of examples, for some phrases this will require a confidence threshold of 95%, and for some it will require 65%. For instance, if we want to have 100% TPs, we might find that that our confidence threshold needs to be 90% or higher for a certain common phrase.

For example, if an exemplary common phrase is: "Heart Regular rate and rhythm no murmurs or gallops heard," the method 900 will match the exemplary common phrase against all of the SR output available and to obtain a confidence score for each match. In at least one embodiment of the present disclosure, the matches are compared to the final document to determine if this match would have been a True Positive (i.e. that this is an actual occurrence of the exemplary common phrase in the document) or a False Positive (i.e. that the exemplary common phrase does not exist). It will be appreciated that false positives are detrimental in that they could represent cases where the common phrases module would subtract value(s) from the SR output; hence false positives have to be minimized. Continuing with the above example, each purported SR phrase is identified and a confidence score is calculated therewith. The table below shows exemplary matches of each purported SR phrase:

| SR Phrase | Confidence | TP | FP |
|---|---|---|---|
| Heart Regulate rate and rhythm no murmurs or gallops heard | 0.95 | x | |
| Heart Regular rate rhythm no murmurs or gallops heard | 0.9 | X | |
| Heart Regular rate and rhythm murmur gallops heard | 0.75 | x | |
| Heart Regulate rate and rhythm murmurs or gallops heard | 0.85 | x | |
| Heart Regular rate and rhythm slight murmur in S1 no gallops | 0.7 | | X |

Continuing with the above example, the above analysis is performed for all phrases in all documents, and then grouped by confidence scores. The table below displays the calculation of confidence along with TPs and FPs to calculate an Effective FP rate:

| Confidence | TPs | FPs | Effective FP Rate |
|---|---|---|---|
| 0.95 | 25 | 0 | 0 |
| 0.9 | 15 | 4 | 0.09 |
| 0.85 | 17 | 7 | 0.16 |

-continued

| Confidence | TPs | FPs | Effective FP Rate |
|---|---|---|---|
| 0.8 | 20 | 6 | 0.18 |
| 0.75 | 15 | 9 | 0.22 |

It will be appreciated that the final column, "Effective FP Rate," is of primary concern. Effective FP Rate represents the FP rate that is expected when a confidence threshold shown in that row, is used. It will be further appreciated that the method 900 operates to try out different possible parameters for common phrases, whereby one parameter might realize a FP Rate, within a range of 0-1, or by an exemplary embodiment, an FP Rate=0.1. Continuing with the above example, such an FP Rate would translate to picking a confidence threshold of 0.9. This means that the method 900 would only correct soft matches that had a confidence score of 0.9 or higher. By way of another example, if the FP Rate=0.2, then a threshold of 0.8 is chosen. In at least one embodiment of the present disclosure, this is how the parameter FP Rate is translated into a confidence score for each individual common phrase.

In at least one embodiment of the present disclosure, the method 900 includes step 910 of finding the best parameter. In at least one embodiment of the present disclosure, a subset of all phrases is selected, along with the corresponding parameters for each of the phrases. The parameters may be selected from a group consisting of max words, minimum percentage, or FP rate, to name a few, non-limiting examples. In at least one embodiment of the present disclosure, the method 900 operates to further pare down the subset phrases based on the selection of parameters. By way of example, if a phrase of the subset of phrases satisfied the max words and minimum percentage parameters, the phrase is selected. Continuing with this example, if the max words parameter is 10 and min percentage parameter is 50%, then a phrase that is 20 words long or a phrase that only appears in 30% of the training set will not be selected. It will be appreciated that each phrase will also have a needed confidence score set based on the FP rate. It will be further appreciated that the confidence score will account for the FP and TP numbers recorded previously. If there is no confidence threshold that can satisfy the required FP rate, then the phrase will not be selected.

In at least one embodiment of the present disclosure, all of the possible common phrases that have been identified are selected and experimented upon using the test set of completed documents and their corresponding SR output to find the most useful subset of common phrases and parameters for this body of work. For example, after a set of parameters is picked, the set is used to identify a subset of common phrases. Following that, the next step is to use those phrases to modify the body of test documents. It will be appreciated that the experiment is in seeing how that set of common phrases improves the draft outputs—some sets will have no effect; some will make the drafts worse; and, the ideal set will improve the drafts more than any other set.

For each of the documents in the test set of documents, the group of common phrases is used to modify speech recognition output to improve the quality of the draft of the document. It will be appreciated that the document is searched for the "best" possible modification it can make, then that modification is made to the document. It will be further appreciated that the updated document is then searched again, and the cycle repeats for every document in the set of test documents until no new modifications are found.

In at least one embodiment of the present disclosure, during each iteration of the searching, the SR output from before and after the common phrases have been applied, are compared. For example, in a training scenario, two drafts can be compared to the final completed document which should be 100% accurate. Ideally, such a "gold standard" allows for the determination of the qualitative improvement of the draft after applying common phrases, and by how much. It will be appreciated that such metrics are calculated for each document in the set of test documents and records such information for each set of training parameters. In at least one embodiment of the present disclosure, the metrics are aggregated and the set of parameters that resulted in the best improvement are chosen (i.e. the best parameter).

In at least one embodiment of the present disclosure, the set of parameters that resulted in the best improvement to the test set of speech recognition output, along with its corresponding set of common phrases, is stored in the database. These paired objects are retrieved each time a new analysis request is received.

In at least one embodiment of the present disclosure, after the phrases are saved the SR output is analyzed for the phrases that are the best set of common phrases that were saved based on the previous analysis. In at least one embodiment of the present disclosure, the group of the best set of common phrases is used to modify the SR output to improve the quality of the draft document. It will be appreciated that the document is searched for the "best" possible modification, and then such modification is made to the document. It will be further appreciated that the new document is then searched continuously until no new modifications are found. The resulting output will be the original SR document, but modified to use the best set of common phrases, that yield a more accurate SR document.

Figure 10:
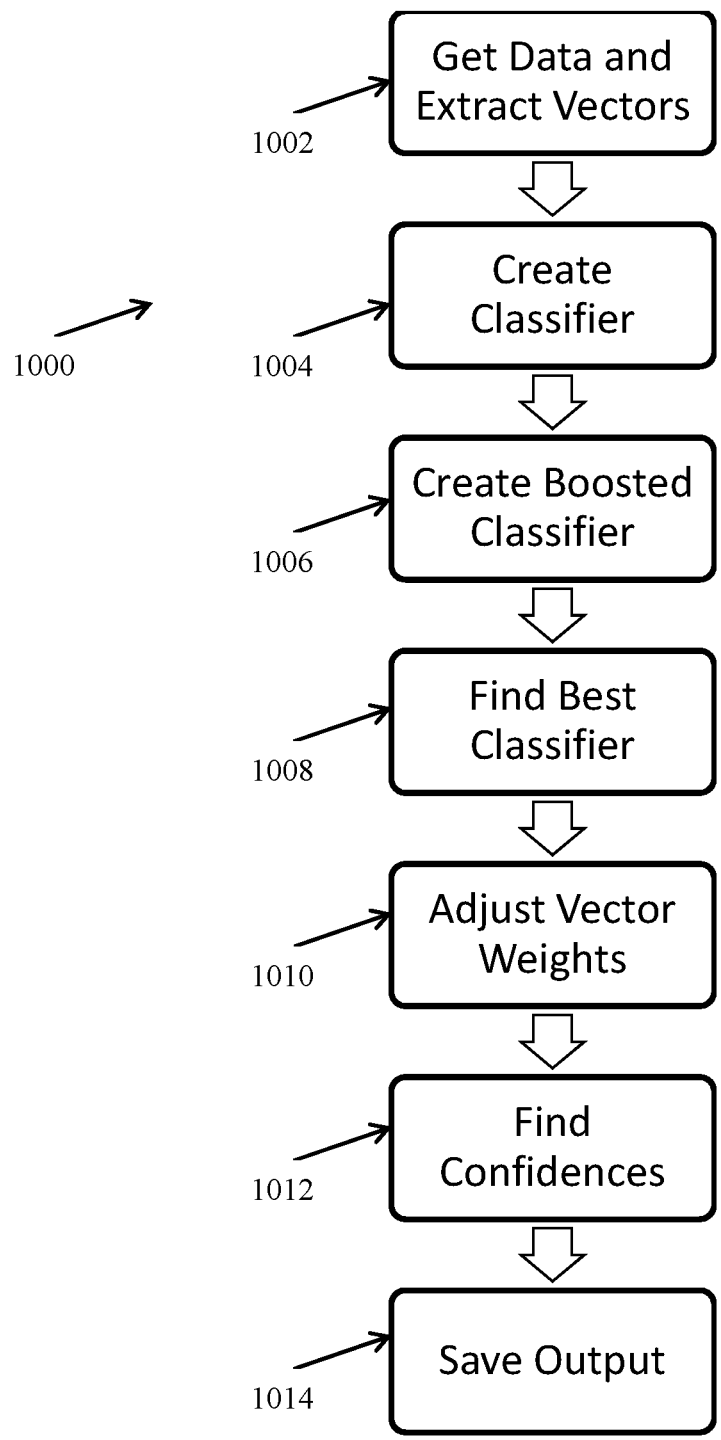
FIG. 10 shows a flowchart of at least one embodiment of a computer-implemented method of processing dictation, according to the present disclosure.

Referring now to FIG. 10, it is shown a method for language detection recognition and automatic document identification, generally indicated at 1000. According to at least one embodiment of the present disclosure, the method 1000 includes step 1002 of getting data and extracting vectors; step 1004 of creating classifiers; step 1006 of creating boosted classifiers; step 1008 of finding best classifiers; step 1010 of adjusting vector weights; step 1012 of finding confidences; and step 1014 of saving output. It will be appreciated that when performing speech recognition, knowing the document type can help narrow the language model, and assist speech recognition. It will be further beneficial to know the document type prior to any speech recognition or transcription being performed on an audio file.

In at least one embodiment of the present disclosure, data is gathered and vectors are extracted at step 1002. In order to build a classifier for the transcription of a particular user's audio file, a training set of that user's audio file(s) is/are downloaded. It will be appreciated that the actual document type for all of training set audio files is already known since the documents have been previously transcribed using speech recognition. Each audio file and corresponding supporting information are then processed into a feature vector consisting of the following features, to name a few, non-limiting examples: 1) SR output for a portion of the audio file (currently the first 30 seconds) using a balanced language model built from equal parts of each document type, so if there are 4 possible document types, 25% of the data for the language model will come from each type; 2) SR output for a portion of the audio file (currently the first 30 seconds) using a pooled language model built from data proportional to the volume of the possible document types, so, by way of one exemplary embodiment, if 90% of the work is document type 1 and 10% is document type 2, then 90% of the data in the language model will be doc type 1 and 10% will be doc type 2; 3) the type of device used to dictate the job; 4) the day the job was submitted; 5) the time the job was submitted; 6) the duration of the job; 7) the number of silences; 8) the total duration of silences; 9) the noise threshold used to define what "silence" is for this job; 10) the number of silences per second; 11) the total duration of silence per second; 12) the average amplitude in the job; 13) the standard deviation of the amplitude in the job; 14) the number of long silences per second; 15) the total duration of long silences per second.

At step 1004, a classifier is created. In at least one embodiment of the present disclosure, a number of different types of classifiers are built, evaluated, and then used for boosting. It will be appreciated that each time a new classifier is added to the boosted classifier (which is just a weighted combination of 1 or more of the basic classifiers), the vectors are reweighted so that vectors that the boosted classifier gets wrong will be emphasized. Once adding a new classifier no longer improves accuracy, the boosted classifier is returned.

In at least one embodiment of the present disclosure, a host of classifiers can be used for boosting, based on three categories of classifiers, at step 1006. It will be appreciated that some variables are used to create different classifiers within the same category (by way of one exemplary embodiment one k-nearest classifier comprises k=5 and one with k=10). In at least one embodiment of the present disclosure, a language classifier, a decision Tree classifier, and a K nearest classifier, are used, to name a few, non-limiting examples.

For each classifier, its performance on the set of vectors is measured by leave-one-out cross-validation, as is well known to one having ordinary skill in the art. It will be appreciated that the classifier's performance against the training vector v, is based on the classifier using every vector except v, then classified v using the resulting classifier.

At step 1008, the method 1000 finds the best classifier. In at least one embodiment of the present disclosure, all of the classifiers that have been created and tested on the set of training vectors will be analyzed, to determine which one performed the best. When evaluating classifiers, a determination must be made as to how well they perform. For example, if there are 100 jobs that need to be performed, then for each classifier a record how many of those jobs correctly performed is measured (e.g. 60 of the 100). The record is done with the leave-one-out method, whereby training is performed on 99 jobs and then classify the one remaining job. This is performed for each of the 100 jobs such that each job is the one "left out." In the base case, each job has the same weight, whereby it is possible to get 60 right, which would be worth 60 'points.' In at least one embodiment of the present disclosure, in subsequent iterations, some jobs could be weighted more highly, so that score could bump up to 80 if the classifier happened to do well on some of the jobs being targeted. It will be appreciated that this classifier is covering some of the blind spots of the current boosted classifier that is constructed, so that they can go ahead and add it in to the boosted classifier.

It will be appreciated that any changing weights of the vectors are accounted for, so that in subsequent iterations certain more difficult samples can be weighted higher (i.e. on the first iteration, the weight for all vectors is 1). It will be further appreciated that a repeat classifier is never picked.

At step 1010, vector weights are adjusted. In at least one embodiment of the present disclosure, the training set of vectors is reweighted so that the samples that are encountering problems based on the current boosted classifier, will be given a higher weight. It will be appreciated that the step 1008 of finding the best classifier may be re-run in order to fill in some of the weaknesses for the current boosted classifier.

It will be further appreciated that the best basic classifier is added to the boosted classifier and the vector weights are adjusted, and then the new best basic classifier is identified. The new best basic classifier is added to the boosted classifier, and the performance tested. It will be further appreciated that the vector weights are adjusted again; the best basic classifier is chosen again, and added to the boosted classifier. In at least one embodiment, this repetitive boosting is done until adding a basic classifier no longer improves performance of the boosted classifier.

At step 1012, performance and confidence scores of the final boosted classifier on the training set of data are evaluated. In at least one embodiment of the present disclosure, the confidence scores are compared to the accuracy of the classifier, to establish present options to the user, and to establish how "sure" they want the classifier to be before making an assignment. By way of example, establishing a non-limiting confidence threshold of 80% corresponds to 75% prediction accuracy; and typically, about 90% of work falls above this threshold.

By way of example, a "confident" classifier, does not always lend itself to being a correct classifier. It will be appreciated that the way a confidence score is generated differs depending on the classifier. Therefore, if we consider grouping all the training documents for the boosted classifier by the confidence score the classifier gave us, and then listed how many of those were correct or incorrect, it would yield the following, as non-limiting examples:

| Confidence | Correct | Incorrect | Effective Accuracy at this Confidence Level or Higher | % of work at or above conf level |
|---|---|---|---|---|
| 100% | 19 | 1 | 95% | 33% |
| 90% | 18 | 2 | 92.5% | 67% |
| 80% | 9 | 11 | 76.7% | 100% |

As shown in the above example, the confidence does not have to match up with the effective accuracy. Therefore, a user may be given the information in the last two columns to make a decision, whereby the corresponding value in the first column is used when operating method 1100.

At step 1014, the output is saved. In at least one embodiment of the present disclosure, the boosted classifier and all supporting structures are saved to the database and allows the enablement of document identification by specifying a maximum error tolerance.

In at least one embodiment of the present disclosure, once the classifier has been saved to the database and document identification is enabled, any new speech recognition requests wherein an audio file is received will start to route through the saved classifier. By way of example, when a doctor dictates a job, a pre-step will take place after the audio is received into the system, but before it is available to a transcriptionist or the production speech recognition software.

Figure 11:
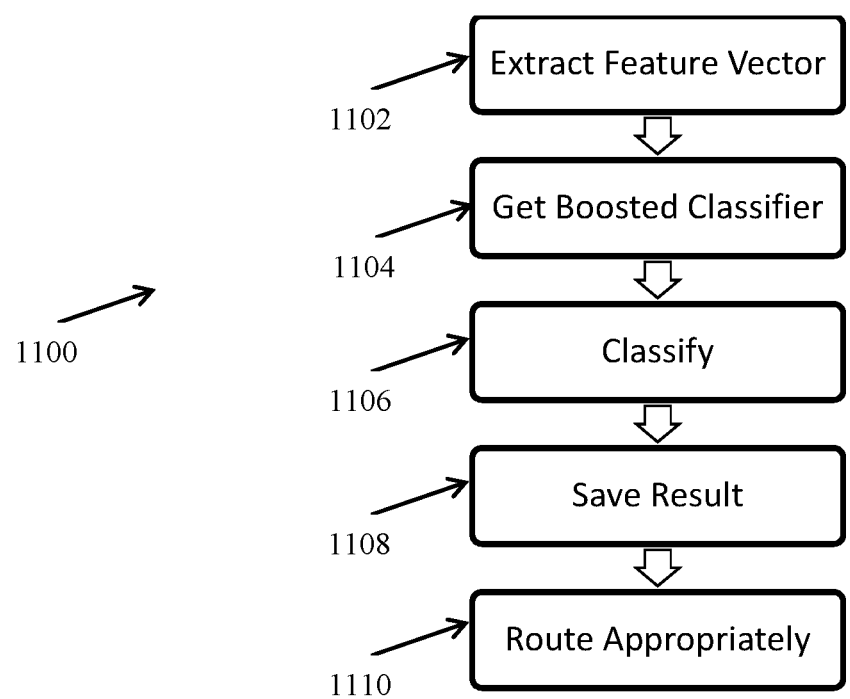
FIG. 11 shows a flowchart of at least one embodiment of a computer-implemented method of processing dictation, according to the present disclosure.

For example, referring to FIG. 11, it is shown a method of performing classification, generally indicated at 1100. The method 1100 includes step 1102 of extracting a feature vector; step 1104 of getting boosted classifier(s); step 1106 of classifying; step 1108 of saving a result; and step 1110 of routing appropriately.

At step 1102, a feature vector is extracted. In at least one embodiment of the present disclosure, all of the features needed for classification are extracted from a dictated audio file, as further illustrated in step 1002. It will be appreciated that a vector is created at this step.

In at least one embodiment of the present disclosure, a boosted classifier is downloaded at step 1104. It will be appreciated that the boosted classifier may include a combination of basic classifiers (e.g. a language classifier, a decision Tree classifier, and a K nearest classifier), and any required supporting information.

At step 1106, classification is performed. In at least one embodiment of the present disclosure, the vector obtained from step 1102 is classified with the boosted classifier. It will be appreciated that each of the basic classifiers are run and their results and confidences are weighted as computed in training. It will be further appreciated that the output will be a predicted document type and a confidence score indicating the confidence level regarding the document type.

At step 1108, the results are saved. In at least one embodiment of the present disclosure, if the confidence score is high enough that it is over the user-supplied threshold, then the document type is applied to the audio file and it is routed at step 1110. If however, the confidence score is below the needed threshold, the audio file may go to an administrator document identification queue. In at least one embodiment of the present disclosure, a person may listen to the audio file and determine which document type should be used and attributed to the file, and other workflow rules can be applied.

The invention claimed is:

1. A computerized method for automated identification of audio records to improve a textual transcript, the method comprising the steps of:
    selecting a plurality of audio records from a database, the each of the plurality of audio records comprising supporting information;
    obtaining a first speech recognition output of the each of the plurality of audio records using a pooled language model;
    obtaining a second speech recognition output of the each of the plurality of audio records using a balanced language model;
    processing the each of the audio records into a feature vector comprising the first speech recognition output, the second speech recognition output, and speech recognition output comprising a plurality of audio record feature vectors, selected from a group consisting of a number of silences, a noise threshold, a number of silences per second, a total duration of silence per second, an average amplitude in the audio record, a standard deviation of the amplitude in the audio record, a number of long silences per second, and a total duration of long silences per second;
    creating a plurality of basic classifiers based on the feature vector and selected from a group consisting of language classifiers, decision tree classifiers, and k-nearest classifiers;
    evaluating the each of the plurality of basic classifiers;
    creating a plurality of boosted classifiers, the each of the plurality of boosted classifiers being a combination of the each of the plurality of basic classifiers;
    testing the performance of the each of the boosted classifiers on a test set of training vectors, and determining which of the each of the boosted classifiers performed the best;
    adding one of the plurality of basic classifiers to the boosted classifier, based on a first vector weight;
    testing the performance of the boosted classifiers;
    adjusting the first vector weight and testing the performance of the each of the boosted classifiers on the test set of training vectors, and determining which of the each of the boosted classifiers performs the best;
    selecting a best boosted classifier; and
    saving the best boosted classifier and supporting structures.

2. The method of claim 1, wherein the audio record feature vectors, is further selected from a group consisting of, a total duration of silences, a type of device used to dictate the audio record, a day the audio record was submitted, a time the audio record was submitted, a duration of the audio record.

3. The method of claim 1, further comprising processing the plurality of records using a best boosted classifier.

4. The method of claim 1, wherein the language classifier receives speech recognition input.

5. The method of claim 1, wherein the decision tree classifier receives non-speech recognition features as input.

6. The method of claim 1, wherein the k-nearest neighbor classifier receives non-speech recognition features, the features supporting the feature vector for distance calculation in a k-nearest algorithm.

7. The method of claim 1, wherein evaluating the each of the plurality of basic classifiers, further comprises testing the each of the plurality of basic classifiers on a test set of training vectors.

8. The method of claim 7, further comprising the step of taking into account any changing weights of the each of the basic classifiers and the corresponding training vectors.

9. A system for automated identification of audio records to improve a textual transcript, the system comprising:
    a database capable of receiving a plurality of audio records, the each of the plurality of audio records comprising supporting information;
    a processor operably coupled to the database, and configured to:
        obtain a first speech recognition output of the each of the plurality of audio records using a pooled language model;
        obtain a second speech recognition output of the each of the plurality of audio records using a balanced language model;
        process the each of the audio records into a feature vector comprising the first speech recognition output, the second speech recognition output, and speech recognition output comprising a plurality of audio record feature vectors, selected from a group consisting of a type of device used to dictate the audio record, a day the audio record was submitted, a time the audio record was submitted, a duration of the audio record, a number of silences, a noise threshold, a number of silences per second, a total duration of silence per second, an average amplitude in the audio record, a standard deviation of the amplitude in the audio record, a number of long silences per second, and a total duration of long silences per second;
create a plurality of basic classifiers based at least in part on the feature vector;
evaluate the each of the plurality of basic classifiers;
create a plurality of boosted classifiers, the each of the plurality of boosted classifiers being a combination of the each of the plurality of basic classifiers;
test the performance of the each of the boosted classifiers on a test set of training vectors, and determining which of the each of the boosted classifiers performed the best;
add one of the plurality of basic classifiers to the boosted classifier, based on a first vector weight;
test the performance of the boosted classifiers;
adjust the first vector weight and testing the performance of the each of the boosted classifiers on the test set of training vectors, and determining which of the each of the boosted classifiers performs the best;
select a best boosted classifier; and
save the best boosted classifier and supporting structures.

10. The system of claim 9, wherein the audio record feature vectors, is further selected from a group consisting of speech recognition output using a total duration of silences a type of device used to dictate the audio record, a day the audio record was submitted, a time the audio record was submitted, a duration of the audio record.

11. The system of claim 10, wherein the processor is further configured to receive speech recognition input.

12. The system of claim 10, wherein the processor is further configured to receive non-speech recognition features as input.

13. The system of claim 10, wherein the processor is further configured to receive non-speech recognition features, the features supporting the feature vector for distance calculation in a k-nearest algorithm.

14. The system of claim 9, wherein the processor is further configured to process the plurality of records using the best boosted classifier.

15. The system of claim 9, wherein the processor is further configured to test the each of the plurality of basic classifiers on a test set of training vectors.

16. The system of claim 9, wherein the processor is further configured to take into account any changing weights of the each of the basic classifiers and the corresponding training vectors.

* * * * *